Sept. 18, 1923.

W. L. ADAMS

FISHING REEL

Filed Aug. 15, 1916

Inventor.
Walter L. Adams
By Brockett and Hyde
Atty's.

Patented Sept. 18, 1923.

1,468,128

UNITED STATES PATENT OFFICE.

WALTER L. ADAMS, OF AKRON, OHIO, ASSIGNOR TO THE ENTERPRISE MANUFACTURING COMPANY, OF AKRON, OHIO, A CORPORATION OF OHIO.

FISHING REEL.

Application filed August 15, 1916. Serial No. 115,069.

*To all whom it may concern:*

Be it known that I, WALTER L. ADAMS, citizen of the United States, residing at Akron, in the county of Summit and State of Ohio, have invented certain new and useful Improvements in Fishing Reels, of which the following is a specification.

This invention relates to fishing reels of the free spool level wind type.

The object of the invention is to provide a fishing reel with free spool level winding mechanism of a type such that when reeling in the level winding mechanism will automatically engage the line at the ends of the spool and reverse the laying of the line upon the spool and follow it up across the spool to insure a perfect winding and when the line is reeled out the free spool mechanism will quickly release the spool and the level winding mechanism will be thrown out of operative position automatically with respect to the line so that its free reeling off will not be interfered with.

The invention also relates to suitable manually operated spool rotating mechanism together with means for automatically releasing the spool from the rotating mechanism upon a pull on the line and a release of the rotating mechanism.

The invention may be further briefly summarized as consisting in the construction and combination of parts hereinafter set forth in the following drawings, description and claims.

Figure 1:
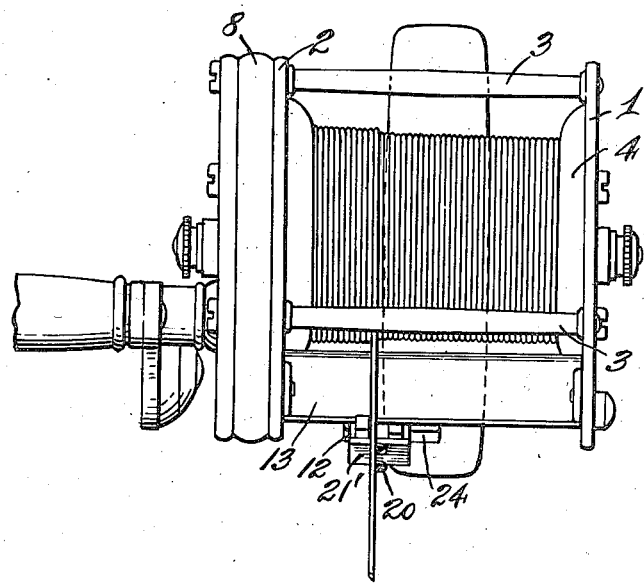
Figure 3:
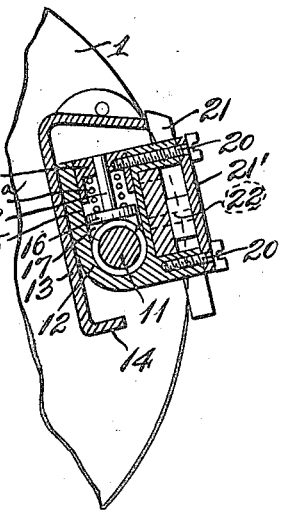
Figure 2:
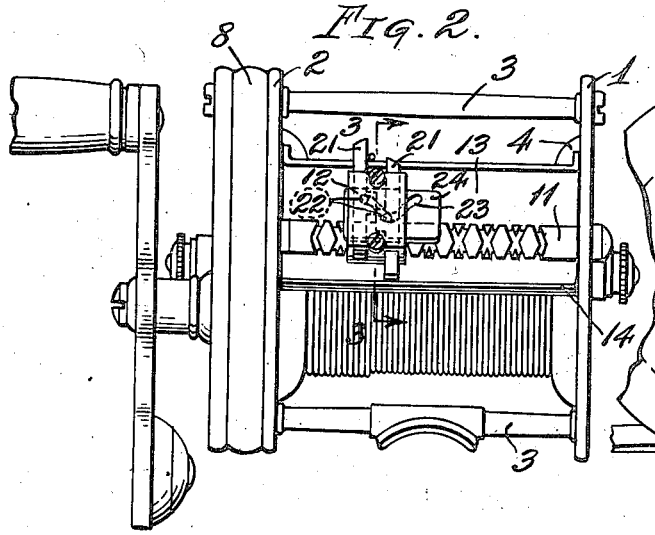
Figure 4:
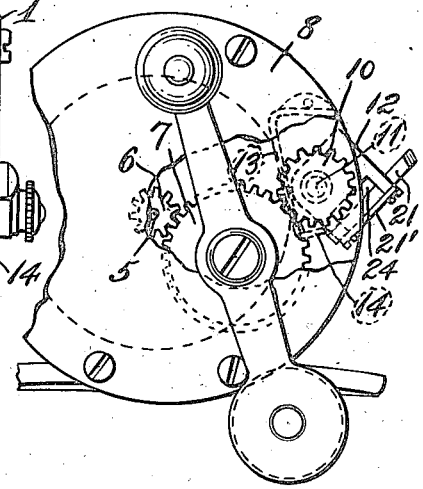

Referring to the drawings Fig. 1 is a top plan view of the complete reel; Fig. 2 is a front elevation; Fig. 3 is a sectional view on the line 3—3, Fig. 2, through the line laying mechanism; and Fig. 4 is an end view of the reel with parts broken away to show the gearing.

In the embodiment shown, 1 and 2 represent the end frame plates connected by cross rods 3 in the usual manner. Mounted in the frame formed by these parts is the spool 4 supported in suitable bearings in the end plates. The shaft 5 of the spool is provided with a pinion 6 meshing with a driving gear 7 supported in a suitable bearing in a gear casing 8 secured to the end plate 2. The gear 7 meshes with a gear 10 secured to a shaft 11 extending from one end plate to the other and having suitable bearings therein. This shaft 11 is provided with spiral grooves common in this class of devices. Loosely mounted on this grooved shaft between the end plates is a traveling block 12 adapted to swing upon the shaft and to engage the guard plate 13 when in operative position, as shown in Fig. 3 or a lip 14 when in inoperative position, as shown in Fig. 4.

This block 12 is provided with an opening 15 extending radially with respect to the shaft 11 and adapted to receive a nut member 16 having a projection 17 for engagement in the grooves of said shaft 11. The nut member is further provided with a shank 18 extending up through a plug 19 secured in the opening 15 by one of a pair of screws 20 which will be referred to hereinafter. The spring 20ª normally tends to force the nut member toward the grooved shaft. The block 12 is further provided upon its front with suitable guide ways for receiving line engaging bars 21 which are arranged in pairs and slide in the block in planes at right angles to the axis of the shaft 11 and each of these rods is provided with a pin 22 engaging in a V shaped slot 23 in a cam plate 24 slidably mounted in the block 12. The bars 21 are held in place in the block by a retaining plate 21' which in turn is held by the screws 20. This cam plate 24 is adapted to slide in a plane in parallelism to the axis of the shaft 11 and the pins 22 in the line engaging bars 21 are so located that when the cam plate 24 is moved to the right the left hand bar 21 is elevated as shown in Fig. 2 and vice versa. This cam plate is moved by engagement with the end plates of the frame as the block moves back and forth across the spool. The tension of the spring 20ª is sufficient to create a drag between the parts such that when the shaft 11 is rotated in a counter-clockwise direction, as shown in Fig. 3, the entire mechanism just described is rotated in a like direction into the position shown in Fig. 3. When the shaft 11 is rotated in a clockwise direction, however, the entire mechanism just described and carried by the block 12 is rotated into the position shown in Fig. 4 when the line engaging bars 21 are out of a plane touching the upper edge of the guard plate and parallel with the line so that the bars will not interfere with the line when running out.

When using the reel as shown in Figs. 1 to 4, the user in reeling in the line causes the movement of the block 12 back and forth across the spool and the cam plate 24 causes one of the line engaging bars 21 to be elevated at the end of each movement of the block and reverse the laying of the line upon the spool, thus producing what is termed in the art as the level winding of the line.

Having described my invention, I claim:—

1. In a fishing reel, a frame, a spool, rotating mechanism for said spool, and level winding mechanism including a block, means for moving said block back and forth across said spool, line engaging members mounted in said block, and means adapted to be actuated at the ends of the movement of said block for rendering said members alternately effective and ineffective to cause them to engage the line at the ends of the spool and reverse the laying thereof on the spool.

2. In a fishing reel, a frame, a spool, rotating mechanism for said spool, and level winding mechanism including a block, means for moving said block back and forth across said spool, line engaging members mounted in said block, and cam means adapted to be actuated at the ends of the movement of said block for rendering said members alternately effective and ineffective to cause them to engage the line at the ends of the spool and reverse the laying thereof on the spool.

3. In a fishing reel, a frame, a spool, rotating mechanism for said spool, and level winding mechanism including a block, means for moving said block back and forth across said spool, line engaging members mounted in said block, and means adapted to be actuated at the ends of the movement of said block for moving said line engaging members into and out of operative relation with the line to cause them to engage the line at the ends of the spool and reverse the laying thereof on the spool.

4. In a fishing reel, a frame, a spool, mechanism for rotating said spool, a level winding mechanism including a block, means for moving said block back and forth across the spool, line engaging bars mounted in said block, and controlling means therefor adapted to move said bars alternately into and out of operative relation with the line, whereby one bar engages the line from one direction and the other bar from the opposite direction to reverse the laying of the line upon the spool.

5. In a fishing reel, a frame, a spool, mechanism for rotating said spool, a level winding mechanism including a block, and means for moving said block back and forth across the spool, line engaging bars mounted in said block, controlling means therefor adapted to move said bars alternately into and out of operative relation with the line, whereby one bar engages the line from one direction and the other bar from the opposite direction to reverse the laying of the line upon the spool, and automatic means governed by the rotation of said rotating mechanism for moving said level winding mechanism as a whole into and out of operative position.

6. In a fishing reel, a frame, a spool, rotating mechanism for said spool, and level winding mechanism including a block, means for moving said block back and forth across said spool, line engaging bars mounted in said block, a cam plate having a V-shaped cam recess, and pins carried by said bars for engaging in said cam recess, said cam plate being adapted to engage the frame at each end of the movement of the block and operate said bars.

In testimony whereof I affix my signature.

WALTER L. ADAMS.